US011474231B2

(12) United States Patent
Bromberg (10) Patent No.: US 11,474,231 B2
(45) Date of Patent: Oct. 18, 2022

(54) CALIBRATION, CLASSIFICATION AND LOCALIZATION USING CHANNEL TEMPLATES

(71) Applicant: Movano Inc., Pleasanton, CA (US)

(72) Inventor: Matthew C. Bromberg, Wenatchee, WA (US)

(73) Assignee: Movano Inc., Pleasanton, CA (US)

( * ) Notice: Subject to any disclaimer, the term of this patent is extended or adjusted under 35 U.S.C. 154(b) by 675 days.

(21) Appl. No.: 16/542,342

(22) Filed: Aug. 16, 2019

(65) Prior Publication Data

US 2021/0255305 A1    Aug. 19, 2021

Related U.S. Application Data

(63) Continuation-in-part of application No. 16/541,730, filed on Aug. 15, 2019.
(Continued)

(51) Int. Cl.
*G01S 13/72* (2006.01)
*G01S 7/40* (2006.01)
(Continued)

(52) U.S. Cl.
CPC ............... *G01S 13/72* (2013.01); *G01S 7/40* (2013.01); *G01S 19/256* (2013.01); *G06K 9/6278* (2013.01); *G06V 40/20* (2022.01)

(58) Field of Classification Search
None
See application file for complete search history.

(56) References Cited

U.S. PATENT DOCUMENTS 6,571,104 B1    5/2003    Nanda et al.
7,119,739 B1 *  10/2006   Struckman ............. G01R 29/10
                                                342/372
(Continued)

FOREIGN PATENT DOCUMENTS

JP    H 11510981 A    9/1999
WO    WO 2004/075577 A1    9/2004
(Continued)

OTHER PUBLICATIONS

Al-Salihi, H. et al., "Bayesian Compressed Sensing-based Channel Estimation for Massive MIMO Systems," EURASIP Journal on Wireless Communications and Networking, Dec. 31, 2017, pp. 1-5.
(Continued)

*Primary Examiner* — Erin F Heard
*Assistant Examiner* — Hailey R Le
(74) *Attorney, Agent, or Firm* — Loza & Loza, LLP (57) ABSTRACT

There is provided a method of parameter estimation in a multi-channel signal environment system wherein a plurality of receiving antennas receives signals or waves from one or more targets due to one or more transmitters that transmit a predetermined signal that is reflected back from the targets or receives signals that are directly transmitted from one or more external transmitters to the receiving antennas and then processed over multiple frequencies or channels by a digital receiver connected to one or more processors. The method comprises steps including (a) comparing received voltages to an analytic or a table driven calibrated channel model without only relying on information from lossy intermediate steps such as time of arrival ("TOA") or angle of arrival ("AOA") measurements; and (b) mitigating channel model calibration errors, including multiplicative channel noise, phase noise, clutter or multipath modeling errors, by using a noise model to estimate away error nuisance parameters,
(Continued)

Radar Transceiver either during a prior calibration process or during a real time calibration process concurrent with localization and parameter estimation during normal system operation.

32 Claims, 6 Drawing Sheets

Related U.S. Application Data (60) Provisional application No. 62/764,814, filed on Aug. 16, 2018.

(51) Int. Cl.
*G06K 9/62* (2022.01)
*G06V 40/20* (2022.01)
*G01S 19/25* (2010.01)

(56) References Cited

U.S. PATENT DOCUMENTS

| | | | |
|---|---|---|---|
| 9,304,184 | B1 | 4/2016 | Draganov et al. |
| 2004/0072577 | A1 | 4/2004 | Myllymaki et al. |
| 2008/0198072 | A1* | 8/2008 | Elwell .................. G01S 19/428 342/357.29 |
| 2009/0042526 | A1 | 2/2009 | Maulik et al. |
| 2010/0008406 | A1 | 1/2010 | Sawai et al. |
| 2011/0287801 | A1 | 11/2011 | Levin et al. |

FOREIGN PATENT DOCUMENTS

| | | |
|---|---|---|
| WO | WO 2013/013169 A1 | 1/2013 |
| WO | WO 2016/174679 A2 | 11/2016 |

OTHER PUBLICATIONS

PCT International Search Report and Written Opinion, PCT Application No. PCT/US2019/046737, dated Dec. 5, 2019, 8 pages.
PCT International Search Report and Written Opinion, PCT Application No. PCT/US2019/046741, dated Dec. 5, 2019, 9 pages.
Non Final Office Action, U.S. Appl. No. 16/541,730; (dated Apr. 26, 2022), 10 pgs.

* cited by examiner

Figure 1: Radar Transceiver

Figure 2: Background Cancellation

Figure 3: Calibration Algorithm

Figure 4: Blind Calibration Algorithm

Figure 5: Target Calibration

Figure 6: Classification Algorithm

Figure 7: Hardware Overview

Figure 8

Figure 9: Movano SIMD Processor Architecture

Figure 10: Parallel Reduction Operation

CALIBRATION, CLASSIFICATION AND LOCALIZATION USING CHANNEL TEMPLATES

CROSS REFERENCE TO RELATED INVENTIONS

The present invention in a continuation in part of U.S. application Ser. No. 16/541,730, and this application and the parent application claim priority to U.S. Provisional Application Ser. No. 62/764,814 filed on Aug. 16, 2018, both of which are incorporated in their entirety by reference.

BACKGROUND OF THE INVENTION

This invention introduces additional details regarding calibration and geolocation techniques first introduced in the prior referenced applications. This application focuses on simplified channel models and techniques that can exploit those models for geolocation and object classification.

SUMMARY OF THE INVENTION

In one embodiment, there is provided a method of parameter estimation in a multi-channel signal environment where a plurality of receive antennas and/or a plurality of transmitters transmit a signal that is known or estimated, that is processed over multiple frequencies or channels, by a digital receiver and one or more processors whose processing includes the following steps. First, an analytic or table driven channel model is used for comparing received voltages vs a calibrated template, without only relying on information lossy intermediate steps such as delay or angle measurements. A statistical likelihood function is used to model the receiver noise, channel parameters, or prior channel uncertainty. Then a Bayesian detection or other Statistical Signal Processing Techniques is used for the estimation of channel parameters such as location parameters, shape parameters, and reflector electromagnetic parameters. A saving target reflector/emitter parameters is reused for dynamic tracking. Finally, Bayesian particle filtering or Maximum Likelihood Methods is used to update mixture models for the unknown parameters.

Numerous other advantages and features of the invention will become readily apparent from the following detailed description of the invention and the embodiments thereof, from the claims, and from the accompanying drawings.

BRIEF DESCRIPTION OF THE FIGURES

A fuller understanding of the foregoing may be had by reference to the accompanying drawings, wherein.

DESCRIPTION OF THE INVENTION

While the invention is susceptible to embodiments in many different forms, there are shown in the drawings and will be described in detail herein the preferred embodiments of the present invention. It should be understood, however, that the present disclosure is to be considered an exemplification of the principles of the invention and is not intended to limit the spirit or scope of the invention and/or claims of the embodiments illustrated.

Channel Model

Figure 1:
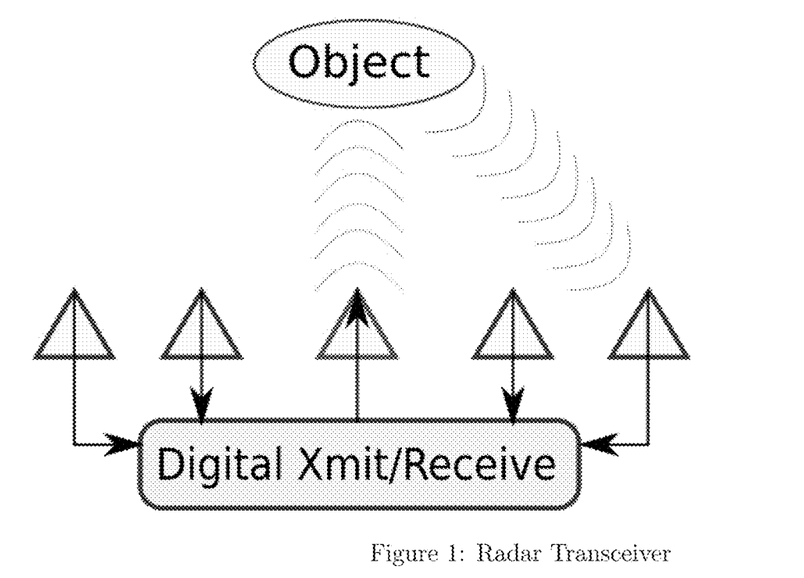
FIG. 1 is a radar transceiver.

Consider a radar configuration of the form shown in FIG. 1. We already shown on to modify the calibration signal model in the previous reference application. At the receive antennas we assume a signal of the form, $$v_{mk}^q(p_q) = \sum_{l=1}^{L} \beta^q \alpha_{mk}^l b_{lmk}(p_q) + \varepsilon_{mk}^q, \quad (1)$$

where $v_{mk}^q(p_q)$ is the voltage seen by the m'th sensor, $1 \ldots M$, k'th frequency/channel, $k=1 \ldots K$ and the q'th calibration collect, $q=1 \ldots Q$, where $b_{lmk}(p_q)$ is a channel model basis function for the m'th sensor and k'th frequency/channel, $\varepsilon_{mk}^q$ is an additive receiver thermal noise term, and where $p_q$ is the "position" and shape parameter vector, for the q'th calibration event. An unknown bulk complex scalar term $\beta^q$ is presumed to model any rapidly changing, highly sensitive phase dependency for each collect. It is often easier to maintain precise relative phases between antennas and frequencies, than bulk phases over time or position. The noise is assumed to be Gaussian, and can be assumed to be white, if pre-whitening is performed as needed.

Figure 2:
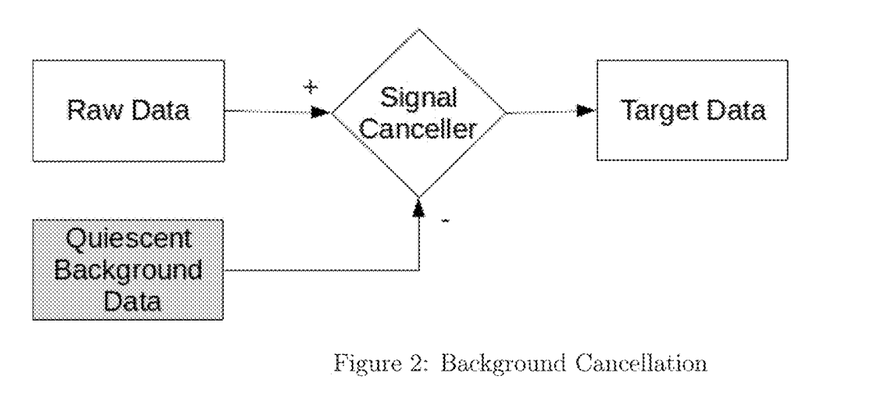
FIG. 2 is a flow diagram of background cancellation.

The channel voltages $v_{mk}^q(p_q)$ will typically be observed after canceling a model of the stationary background data from the current, received data. The stationary background is collected over quiescent periods of the transceiver device, prior to target entering the field of view. The canceller will be preferably of the least squares type, or a simple subtraction, and can generally be written as, $$v_{mk}^q = x_{mk}^q - \alpha^q y_{mk},$$

where $x_{mk}^q$ is the raw receiver data, q is the collect index, $y_{mk}$ is the average background voltage for antenna m and frequency index k, and where $\alpha^q$ are some cancellation constants. The operation is illustrated in FIG. 2.

Note that the basis functions are typically chosen from geometric wave-functions, such as spheroidal wave functions, cylinder wave-functions and elliptical wave functions. These functions were previously described in the referenced applications. Some of the first few radial spheroidal wave functions are given by, $$h_0^1(\kappa r) = -i\frac{\exp(i\kappa r)}{\kappa r}$$

$$h_0^2(\kappa r) = -i\frac{\exp(-i\kappa r)}{\kappa r}$$

$$h_1^1(\kappa r) = \frac{-\exp(i\kappa r)}{\kappa r}\left(1 + \frac{i}{\kappa r}\right)$$

$$h_1^2(\kappa r) = \frac{-\exp(-i\kappa r)}{\kappa r}\left(1 - \frac{i}{\kappa r}\right)$$

The actual basis functions used will be of the form $h_{m_1}^{n_1}(\kappa r_1)/h_{m_2}^{n_2}(\kappa r_2)$, where $$\kappa = \frac{2\pi f}{c}$$

is the wavenumber, $r_1$ is the distance from the transmitter to the target, and $r_2$ is the distance from the target to a receiver. The terms containing $$\frac{\exp(-i\kappa r)}{\kappa r},$$

associated with the spherical Hankel functions of the 2nd kind represent outgoing waves and are to be preferred. Similarly we can write the first few radial cylindrical wave functions as linear combinations of the Hankel functions $H_n^1(\kappa\rho)$ and $H_n^2(\kappa\rho)$.

We can write Equation (1) in matrix form as, $$v^q = B^q \alpha \beta^q + \varepsilon^q,$$

where $v^q$ is a vector of length MK, whose m+(k−1)M'th element is $v_{mk}^q$, $B^q$ is an MK×LMK matrix with the structure, $$B^q \equiv [\delta(b_1(p_q)), \delta(b_2(p_q)) \ldots \delta(b_l(p_q))], \quad (2)$$

where, $$\delta(b_l(p_q)) \equiv \begin{bmatrix} b_{l11} & 0 & \ldots & 0 \\ 0 & b_{l12}(p_q) & \ldots & 0 \\ \vdots & 0 & \ddots & \vdots \\ 0 & \ldots & & b_{lMK}(p_q) \end{bmatrix},$$

and where, $$\alpha \equiv \begin{bmatrix} \alpha^1 \\ \alpha^2 \\ \vdots \\ \alpha^L \end{bmatrix},$$

$$\alpha^l \equiv \begin{bmatrix} \alpha_{11}^l \\ \alpha_{21}^l \\ \vdots \\ \alpha_{MK}^l \end{bmatrix},$$

and $\varepsilon^q \equiv [\varepsilon_{11}, \varepsilon_{21}, \ldots \varepsilon_{MK}]^T$.

The log-likelihood function for the Q calibration collects can be written as, $$L = -2MK\log(\sigma) - \frac{1}{\sigma^2}\sum_{q=1}^{Q}\|v^q - B^q\alpha\beta^q\|^2. \quad (3)$$

Calibration

Figure 3:
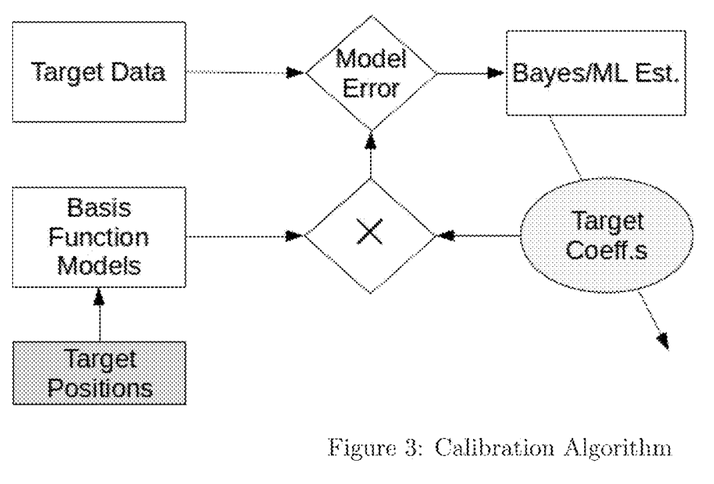
FIG. 3 is a flow diagram of a calibration algorithm.

The calibration process for our transceiver hardware consists of setting objects to be calibrated at known positions in a calibration grid. Also measured are the transmit and receiver antenna positions all for the purpose of evaluating the $b_{lmk}(p_q)$ basis functions at position $p_q$. The electromagnetic channel is sampled by the M receive antennas after transmitting a stepped frequency radar signal, for the radar application of this invention. The algorithm is illustrated in FIG. 3.

Mathematically the calibration problem involves solving for target coefficients, collected in a channel gain vector $\alpha$ in Equation (3) either using Maximum Likelihood (ML) estimation or using Bayesian estimation with a prior distribution presumed for $\alpha$. However the likelihood function can also be used to refine the otherwise known positions of the transmitter(s) and receivers. The likelihood function also serves as a starting point for the classification and localization problem itself during normal operation of the invention.

Suppose $\alpha$ is complex normally distributed with mean $\overline{\alpha}$ and covariance $R_{\alpha\alpha}$, $N(\overline{\alpha}, R_{\alpha\alpha})$. The joint log likelihood can therefore be written as, $$L = -2MK\log(\sigma) - \frac{1}{\sigma^2}\sum_{q=1}^{Q}\|v^q - B^q\alpha\beta^q\|^2 - $$

$$\ldots \log(\det(\pi R_{\alpha\alpha})) - Tr\big((\alpha - \overline{\alpha})^H R_{\alpha\alpha}^{-1}(\alpha - \overline{\alpha})\big).$$

From this, given knowledge of $\beta^q$ the Bayesian estimator for $\alpha$ is given by, $$\hat{\alpha} = \left(\sum_q |\beta^q|^2 B^{qH} B^q + R_{\alpha\alpha}^{-1}\right)^{-1} \left(\sum_q \beta^{q*} B^{qH} v^q + R_{\alpha\alpha}^{-1}\overline{\alpha}\right). \quad (4)$$

If however we need to remove the nuisance parameter $\beta^q$, we can find it's maximum likelihood (ML) estimator and write it as, $$\beta^q = \alpha^H B^{qH} v^q / (\alpha^H B^{qH} B^q \alpha). \quad (5)$$

Using the ML estimator for $\beta^q$ in Equation (5) we obtain the likelihood function, $$L = \quad (6)$$

$$-2MK\log(\sigma) - \frac{1}{\sigma^2}\sum_{q=1}^{Q}\big(\|v^q\|^2 - \alpha^H B^{qH} v^q v^{qH} B^q \alpha / (\alpha^H B^{qH} B^q \alpha)\big) \ldots -$$

$$\log(\det(\pi R_{\alpha\alpha})) - Tr\big((\alpha - \overline{\alpha})^H R_{\alpha\alpha}^{-1}(\alpha - \overline{\alpha})\big).$$

We can use this for Bayesian estimation presuming the empirical Bayes prior, wherein the prior for $\beta^q$ is the delta function centered on the Maximum Likelihood solution in Equation (5). Unfortunately Equation (6) can not be optimized in closed form over $\alpha$ except in very important special cases. Therefore for the general case we optimize using the following algorithm:

General Calibration Algorithm

1. Place target of desired type in known location $p_q$ and evaluate the basis functions $b_{lmk}(p_q)$.
2. Capture the complex channel values due to reflected waveform from the targets at position $p_q$; $v_{mk}^q(p_q)$.
3. Initialize $\alpha$ to $\alpha_{mk}^l = 0$, $l \neq 1$, and $\alpha_{mk}^l = 1$ otherwise.
4. Compute the optimal $\beta^q$ using Equation (5),
5. Compute the optimal $\hat{\alpha}$ using Equation (4)
6. If the number of iterations is less than $N_{its}$ go to General Calibration Algorithm Step otherwise stop.

When $\beta = \beta^q$ is Independent of q.

An important special case that admits a closed form solution occurs when we presume that the unknown receiver gain is actually independent of the q collect number. This situation models the case where the data collection over the q index has been performed within a short time period, or is automated and where the target environment is mostly stationary, or where gain and phase variations are adequately modeled by the $b_{lmk}(p_q)$ basis functions. It is often the appropriate model to use after calibration, but during the parameter estimation phase of the device, e.g. during geo-location or classification.

This model yields a solution for $\hat{\beta}$ as, $$\beta = \alpha^H \sum_{q=1}^{Q} B^{qH} v^q \Big/ \left( \alpha^H \sum_{q=1}^{Q} B^{qH} B^q \alpha \right). \tag{7}$$

If we ignore any priors for $\alpha$, and ignoring superfluous constants, and substituting in Equation (7) we can write the likelihood function as, $$L = \frac{\alpha^H \sum_{q=1}^{Q} B^{qH} v^q \sum_{r=1}^{Q} v^{rH} B^r \alpha}{\alpha^H \sum_{q=1}^{Q} B^{qH} B^q \alpha}.$$

This can be solved by finding the largest eigenvalue and associated vector of the generalized eigenvalue problem, $$\sum_{q=1}^{Q} B^{qH} v^q \sum_{r=1}^{Q} v^{rH} B^r \alpha = \lambda_1 \sum_{q=1}^{Q} B^{qH} B^q \alpha. \tag{8}$$

Collect Independent Algorithm
1. Place target of desired type in known location $p_q$ and evaluate the basis functions $b_{lmk}(p_q)$.
2. Capture the complex channel values due to reflected waveform from the targets at position $p_q$, $v_{mk}^q(p_q)$.
3. Compute the optimal $\hat{\alpha}$ by finding the eigenvector associated with the largest eigenvalue Equation (8).

Independent Basis Inner Product

This special case occurs when $B^{qH}B^q \equiv R_{BB}$ and is not dependent on q and thus independent of the parameter vector $p_q$. The primary application for this is when we have a single phase only basis function, ie L=1. The ideal phase function for preferred use is given by, $$b_{1mk}(p_q) = \exp\left( -i \frac{2\pi f_k}{c} (\|p_q - x_0\| + \|p_q - x_m\|) \right), \tag{9}$$

where $f_k$ is the transmit frequency for index k, $x_0$ is the position of the transmit antenna and $x_m$ is the position of the receive antenna for index m.

In this case $\beta^q$ is solved by Equation (5), and the likelihood function reduces to the Rayleigh quotient, $$L = -2MK\log(\sigma) - \frac{1}{\sigma^2} \sum_{q=1}^{Q} \|v^q\| - \alpha^H \frac{1}{\sigma^2} \sum_{q=1}^{Q} B^{qH} v^q v^{qH} B^q \alpha / (\alpha^H R_{BB} \alpha). \tag{10}$$

This allows us to write our calibration algorithm as,

Independent Basis Inner Product
1. Place target of desired type in known location $p_q$ and evaluate the basis functions $b_{lmk}(p_q)$.
2. Capture the complex channel values due to reflected waveform from the targets at position $p_q$, $v_{mk}^q(p_q)$.
3. Compute the optimal $\hat{\alpha}$ by finding the eigenvector associated with the largest eigenvalue associated with the Rayleigh quotient $$L' = \alpha^H \frac{1}{\sigma^2} \sum_{q=1}^{Q} B^{qH} v^q v^{qH} B^q \alpha / (\alpha^H R_{BB} \alpha). \tag{11}$$

Blind Calibration Algorithm

For target classification, it may be necessary or desirable to perform the classification independently from any knowledge of the target position. We can support this by blindly estimating unknown basis function parameters $p_q$ or a sufficient statistic that depends on them. For the independent Basis inner product case of Independent Basis Inner Product Section we only require knowledge of the phase ramps for each antenna, or equivalently the round trip delay, $r_m^q = (\|p_q - x_0\| + \|p_q - x_m\|)/c$.

Figure 4:
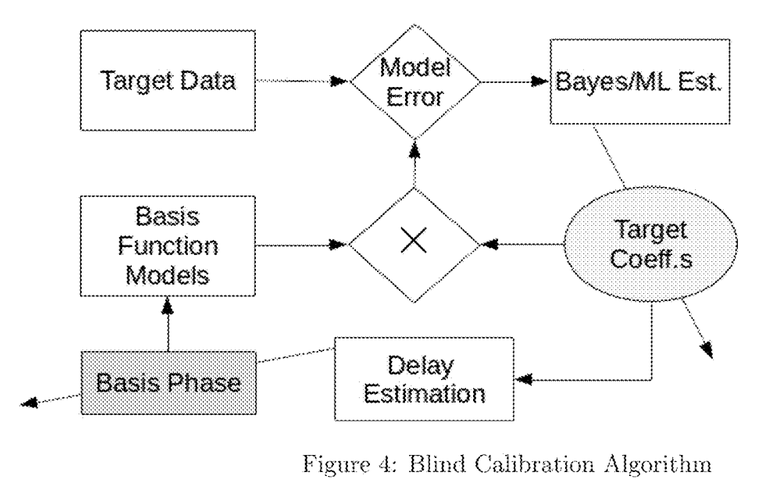
FIG. 4 is a flow diagram of a blind calibration algorithm.

The blind algorithm is illustrated in FIG. 4. The Basis Phase parameters replace the known $p_q$ parameters and are estimated blindly assuming known target coefficients $\alpha_c$ and using the Likelihood function for each q for the $p_q$ or $r_m^q$ optimization. The delays can be estimated by matched filter estimation using various hypothesized delays. This is facilitated by fast Fourier Transforms (FFT) for linearly spaced frequencies $f_k$.

For the independent basis inner product algorithm we can write the likelihood from Equation (11) as, $$L = -\sum_{mkq} |v_{mk}^q|^2 + 2 \sum_{mkq} \Re(v_{mk}^{q*} \beta^q \alpha_{mk}^1 b_{1mk}^q) - \sum_{mkq} |\beta^q \alpha_{mk}^1 b_{1mk}^q|^2.$$

If $b_{1mk}^q \equiv b_{1mk}(p_q)$ is a unit phasor per Equation (9), then, ignoring superfluous constants, we can write this as, $$L' = 2 \sum_{mkq} \Re(v_{mk}^{q*} \beta^q \alpha_{mk}^1 b_{1mk}^q). \tag{12}$$

We can thus choose optimal delays by hypothesis testing by taking the FFT over the k index of $v_{mk}^q \beta^{q*} \alpha_{mk}^{l*}$, for the case of linear frequency spacing $f_k$.

Blind Calibration Algorithm
1. Initialize $\alpha$ to $\alpha_{mk}^l = 0$, $l \neq 1$, and $\alpha_{mk}^l = 1$ otherwise.
2. Capture the complex channel values $v_{mk}^q$ due to reflected waveform from the targets target collect number q.
3. Evaluate the basis functions $b_{lmk}(p_q)$, optimizing blindly the unknown dependency on $p_q$ or equivalently $r_m^q$ using Equation (3) or Equation (12) for each q.
4. Compute the optimal $\beta^q$ using Equation (5),
5. Compute the optimal $\hat{\alpha}$ using Equation (4)
6. If the number of iterations is less than $N_{its}$ go to Blind Calibration Algorithm Step ( ) otherwise stop.

Classification and Localization

Figure 5:
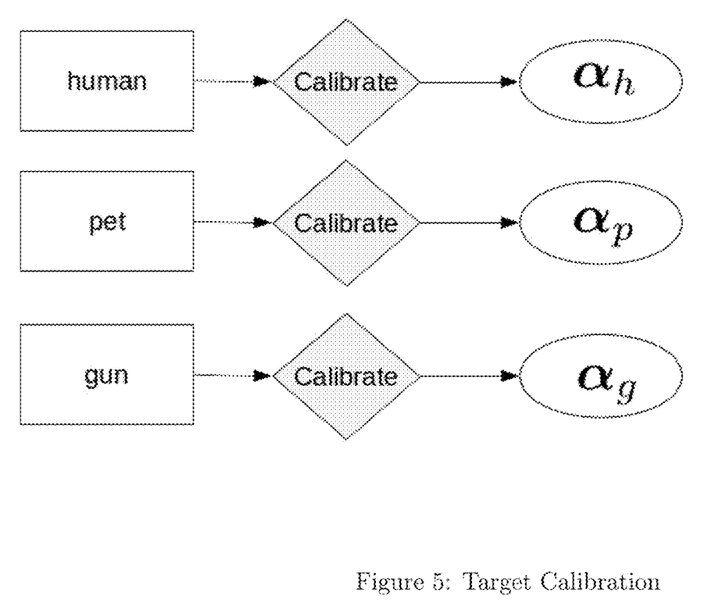
FIG. 5 is a flow diagram of a target calibration.

In order to support target classification we need to calibrate each target category and obtain the channel coefficients $\alpha_c$ specific to category c, as shown in FIG. 5. In general one desires to separately calibrate each type of target we desire to classify.

Let $\alpha_c$ be the channel coefficients for category c. From FIG. 5 the category index might correspond to a human target, pet target or weapon target, though of course other target types can be envisioned. We can estimate all free parameters by using Bayesian inference and the likelihood functions provided in the Calibration Section, herein defined.

Suppose we collect Q data vectors from our transceivers with $v^q$ the associated channel seen for collection q. Let the aggregate collection of the $v^q$ be written as $V \equiv [v^1, v^2, \ldots v^Q]$. Defining, $$B(p) \equiv [\delta(b_1(p)), \delta(b_2(p)) \ldots \delta(b_L((p))],$$

from 2 we can also define the likelihood function, $$L(V, p, \alpha) = -\frac{1}{\sigma^2} \sum_{q=1}^{Q} \|v^q - B(p)\alpha\hat{\beta}^q\|^2, \quad (13)$$

where $\hat{\beta}$ is the optimal scalar dependent on the desired model chosen from the Calibration Section. If we choose the maximum likelihood solution for $\hat{\beta}^q$, we can write the likelihood function as, $$L(V, p, \alpha) = \frac{1}{\sigma^2} \frac{\alpha^H B^H(p) \sum_{q=1}^{Q} v^q v^{qH} B(p) \alpha}{\alpha^H B^H(p) B(p) \alpha}. \quad (14)$$

Figure 6:
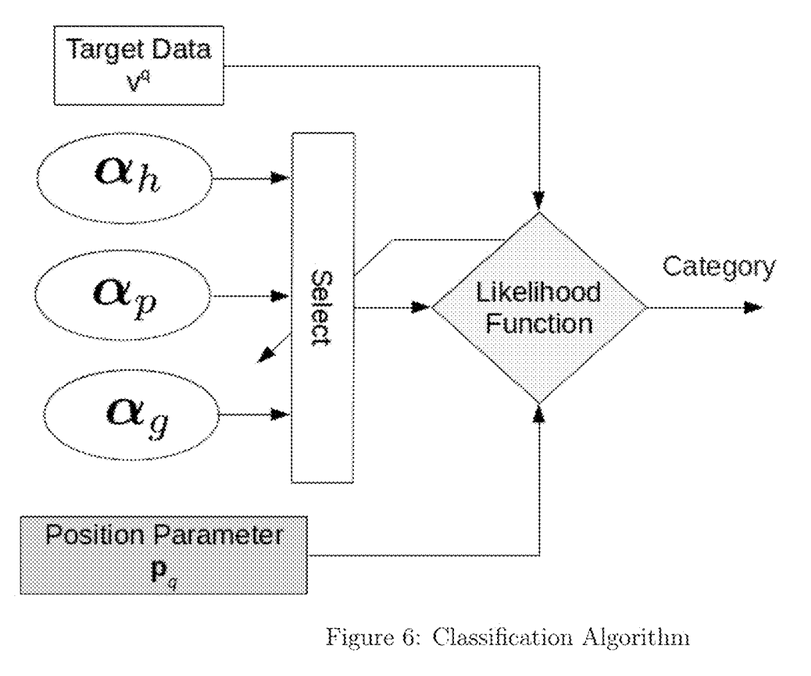
FIG. 6 is a flow diagram of a classification algorithm.

From Bayes theorem we can write, $$P(c|v) = \frac{Prob(v|c)P(c)}{\sum_c Prob(v|c,)P(c)}$$
$$= \frac{\exp(L(v, \hat{p}_c, \alpha_c))P(c)}{\sum_c \exp(L(v, \hat{p}_c, \alpha_c))P(c)},$$

where $\hat{p}_c$ is the optimal position parameter set for the category c. However it is possible to simply choose the phases blindly without proper array knowledge if you are primarily interested in classification instead of localization. The classification algorithm is shown graphically in FIG. 6

For the case where we don't have position or array information, we can classify blindly by learning the sufficient statistics for the unknown position parameter by optimizing Equation (14) over p. This can be done using FFT operations as suggested in the prior Section. The blind classification algorithm is illustrated in Blind-Classification Algorithm.

Hardware Implementation

Figure 7:
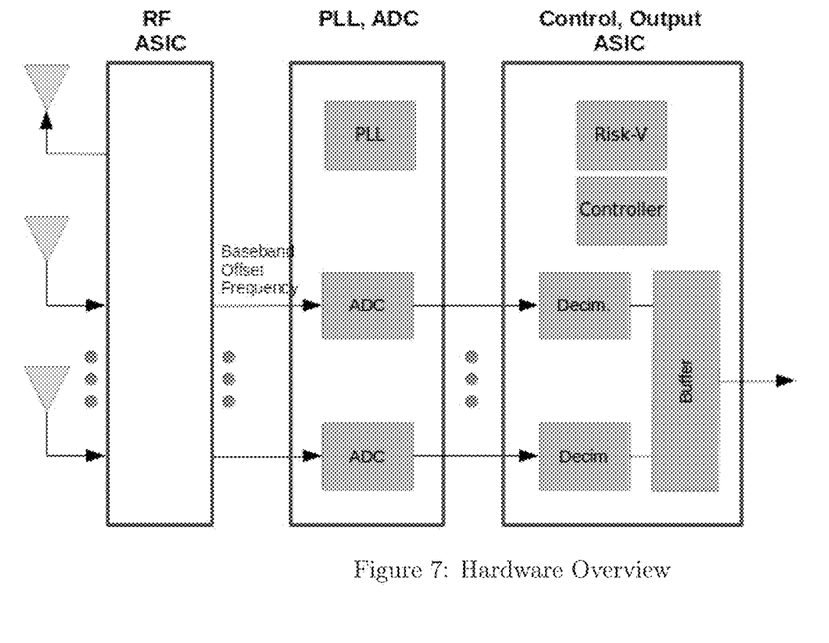
FIG. 7 is a hardware overview.

One implementation of this invention is shown in the functional hardware block diagram in FIG. 7. M antenna receivers are coupled with a transmit antenna. These are fed by an RF ASIC, which is modulated by a phased locked loop and an oscillator. Both the transmit and receive oscillators are locked.

Figure 8:
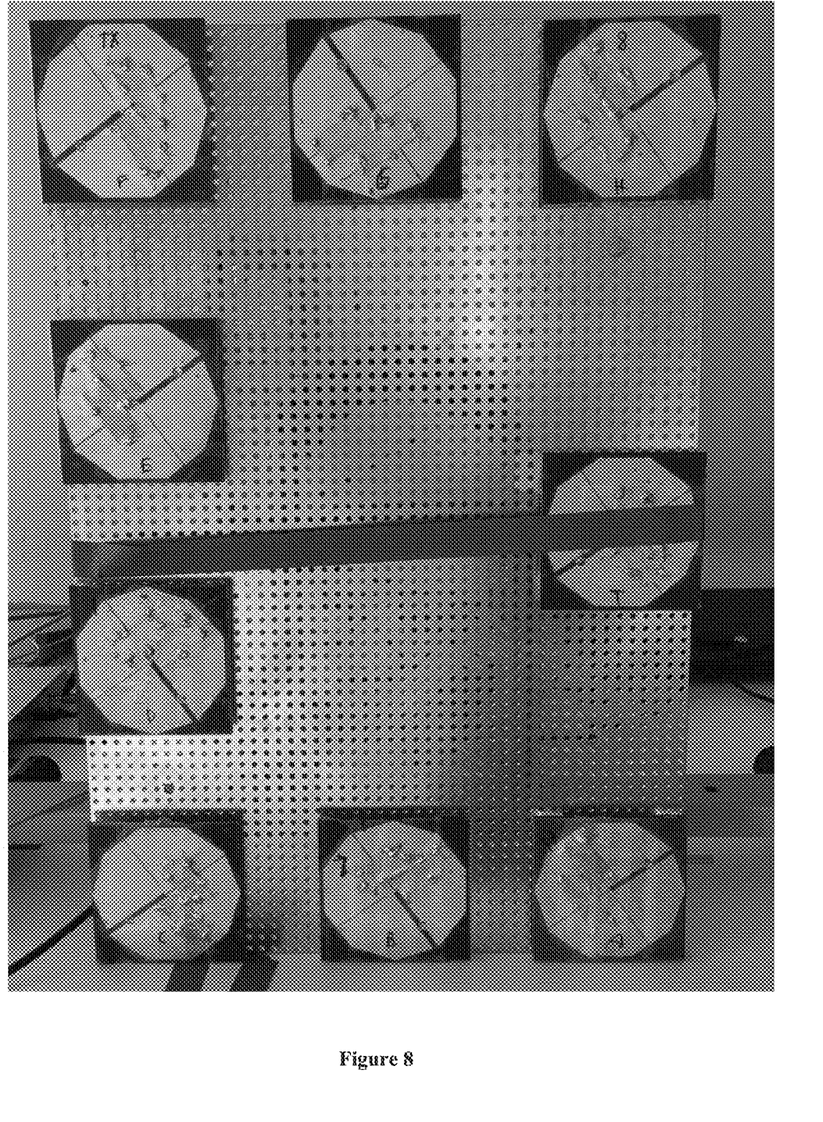
FIG. 8 is an image of an antenna board.

The return signal is downconverted in the RF ASIC and then digitized by a bank of analog to digital converters, followed by a decimation filter where the data is buffered. The algorithms are implemented by DSP processors on board an ASIC device. A demonstration board containing 1 transmit antenna and 8 receive antennas is shown in FIG. 8.

Digital Signal Processing (DSP) Architecture

In order to implement our geolocation algorithms, we need a processor architecture that, is able to compute multiple location hypotheses simultaneously. This could be implemented in a multi-processor layout, but it would be more efficient to use either a single instruction multiple data (SIMD) or single instruction multiple thread (SIMT) architecture, since the same code is executed for each hypothesis. The problem is known as "embarrassingly parallel", since each likelihood computation can be performed without sharing much data between hypothesized positions.

Figure 9:
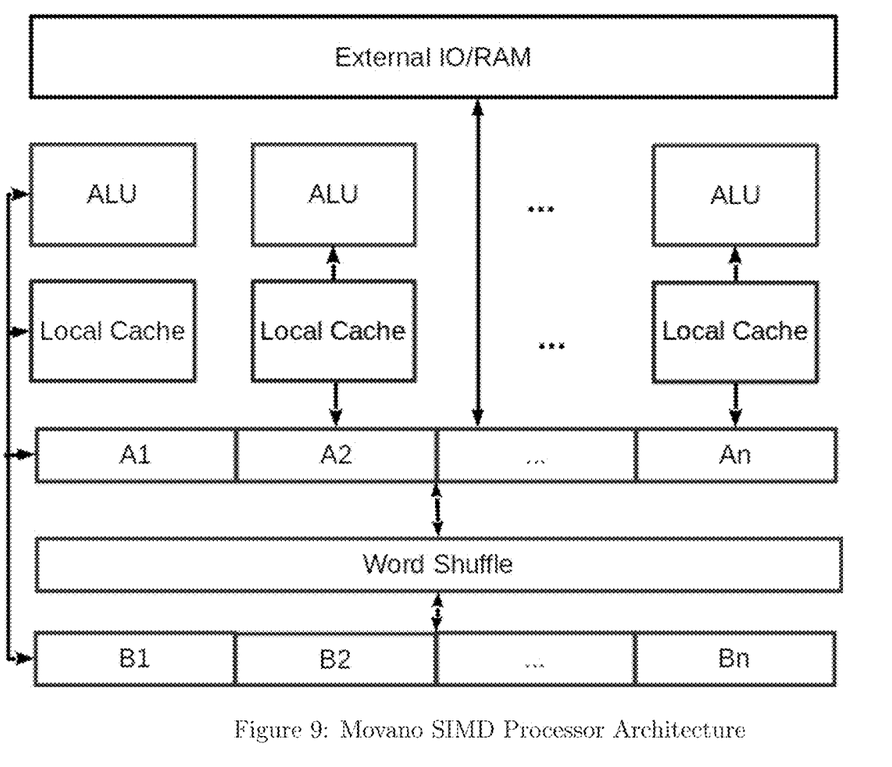
FIG. 9 is an architecture diagram of an SIMD processor in accordance with an embodiment of the invention.

In one embodiment, we implement a SIMD architecture, with some changes made from traditional approaches to make it closer to a SIMT (Single Instruction Multiple Thread) paradigm, used in heterogenous computational models such as CUDA or OpenCL. Consider the architecture shown in FIG. 9. While for the most part every arithmetic-logic unit (ALU) can execute the same instruction on each clock cycle, we have to support more independence for each ALU than is traditionally allowed in most SIMD architectures.

Independently Addressable Local Memory Cache

For a variety of reasons we need to be able to use either the A or B registers to address a local cache of memory unique to each processor. We need this for example to support the parallel computation of transcendental functions, either using independent look up tables and multipliers or look up tables and shifts for CORDIC style algorithms.

We also need local per ALU memory to support something like a parallel FFT, which could be facilitated by distributing the FFT input, with the appropriate decimation, over each independent ALU.

Word Shuffle

We also implement some communication from one register to a neighboring ALUs dedicated register. For parallel reduction over an associative operator like addition or maximization, it suffices to simply be able to communicate with your neighboring ALU.

Figure 10:
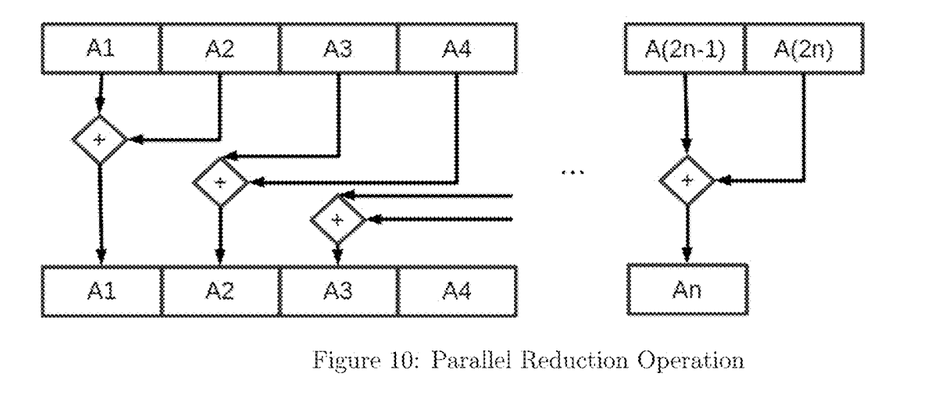
FIG. 10 is an architecture diagram of a parallel reduction operation processor in accordance with an embodiment of the invention.

Consider for example the structure shown in FIG. 10. A reduction step allows operations using inputs from neighboring registers. In general we wish to add the operation $A_n \leftarrow A_{2n-1} \circ A_{2n}$, where $\circ$ is an associative operator, e.g addition multiplication, maximum or minimum. The output, of the operator applied to register $A_{2n}$ is mapped to the register $A_n$ reducing the data registers in use by a factor of 2.

To support the FFT operation we may need some more complicated operations depending on the type of FFT algorithm. For the decimation in time FFT we have the basic relationship, $$FFT(x_{0:(N-1)}) = \sum_{q=0}^{Q-1} e^{-2\pi jkq/N} FFT(x_{q:Q:(N-Q+q)}),$$

where q:Q:M is the Matlab notation for the sequence that starts at q, increases by Q and ends at M or before. For the case of Q=2, we have the standard power of 2 recursion, $$FFT(x_{0:(N-1)}) = FFT(x_{0:2:(N-2)}) + e^{-2\pi jk/N} FFT(x_{0:2:(N-1)}).$$

To support a decimation in time FFT algorithm we need to be able to distribute the input, data to each local cache in a decimation order. Furthermore we need parallel reduction steps to combine the result of the FFT over each ALU section.

For full generality some standard shuffle operations such as register swapping or circular shifts should also be supported.

External IO

We also implement the ability to pass data to all the memory cache's and/or registers from an external source. Each register $A_n$ must be accessible from an external source, both for reading and writing, though this operation does not require any sort of multi-port access.

Branching

While we don't need to support fully independent branching, it will be necessary to support branching by globally looping over all branches until they are exhausted over all the ALU/Register files. We also need an instruction that obtains an ALU number, so that we can index and select based on which ALU/Register pair is in consideration. Additionally having instructions that support a conditional move (similar to the C ? operator), would be helpful.

In accordance with various methods and embodiments outlined herein, there is provided in one embodiment a method of parameter estimation in a multi-channel signal environment system wherein a plurality of receiving antennas receives signals or waves from one or more targets due to one or more transmitters that transmit a predetermined signal that is reflected back from the targets or receives signals that are directly transmitted from one or more external transmitters to the receiving antennas and then processed over multiple frequencies or channels by a digital receiver connected to one or more processors. The method comprises steps including (a) comparing received voltages to an analytic or a table driven calibrated channel model without only relying on information from lossy intermediate steps such as time of arrival ("TOA") or angle of arrival ("AOA") measurements; and (b) mitigating channel model calibration errors, including multiplicative channel noise, phase noise, clutter or multipath modeling errors, by using a noise model to estimate away error nuisance parameters, either during a prior calibration process or during a real time calibration process concurrent with localization and parameter estimation during normal system operation.

The method may also use a Bayesian detection for the estimation of channel parameters such as location parameters, shape parameters and reflector electromagnetic parameters. A Bayesian particle filter may also be used to update mixture models for unknown parameters that might affect the reflected signal from the target. The Bayesian parameter update may also be constrained to place a lower bound on the variance in an effort to allow tracking changes in a parameter vector. It is further contemplated that wherein different shapes or reflector types are calibrated separately so that shape/type inference is possible in the Bayesian estimator.

The method may also save the reflector signal from the target parameters to be reused for dynamic tracking of the target. In other aspect of the method the predetermined transmitted signal is a frequency stepped radar. In yet another object of the invention the target is filtered by a delay range filter to minimize the clutter or focus in on known target parameter ranges. In yet other embodiments, a channel is presumed to have multiplicative Gaussian noise or additive noise not otherwise modeled by the calibration process.

In yet further embodiments, multiple targets and the clutter are separated using multi-user detection techniques such as successive interference cancellation or parallel interference cancellation. In yet other embodiments, one or more targets and the clutter are separated using multi-user detection techniques such as successive interference cancellation or parallel interference cancellation in order to compute constant modulus phase normalization gains.

The method may also track the target state by saving one or more aggregate channel estimates and their gains or whereby the channel itself is a statistical mixture or a state machine requiring multiple discrete channel vectors. The method may also trigger processing a statistic that detects changes in the environment. Other aspects of the embodiments may cause received voltages and calibration tables to be whitened by the Hermitian inverse Cholesky factor of the measured or estimated interference covariance.

In addition, the parameter model includes higher order dynamic parameters such as velocity or acceleration. The method may also use the progression of shapes or locations to infer gesture types. In yet further embodiments, the invention makes use of a higher order singular value decomposition to compress a neural network into a single layer of optimized sum of products form. The method may also decompose the gesture recognition problem, into a set of discrete states whose transitions can be estimated using Bayesian techniques.

The method may also interpolate a wave function using basis functions that are reflected through objects of predetermined shape and electrical properties. As outlined herein, the method may also use a reproducing kernel to generate a model of the reflected signal or a waveform at the receive antennas. The reproducing kernel may be used to dynamically learn the shape of the reflector and/or its electrical parameters. A series decomposition of the reproducing kernel may be used to obtain basis functions of the reflected wave. Alternatively, a higher order singular value decomposition may be used to decompose a tabulated version of the reproducing kernel using far fewer singular values.

In yet further embodiments, electromagnetic imaging techniques are used to find basis functions for the reflected signal or wave. The method may also use conformal mappings to find basis functions for the reflected wave. A Cauchy-Kovalevskaya extension may be used to predict the basis functions for the reflected wave. A Vekua transform may be used to transform a set of basis functions for the simpler Laplace equation into the basis function is used for the more general Helmholtz equation.

The method may factor out the phase centers of an array of antennas for either removal or to reduce the number of bits required for accurate phase representation of the array. As further contemplated a coupling matrix is applied to the output of the array to model mutual antenna coupling. A Bicomplex Clifford algebra, that tracks both the complex pseudoscalar and the unit phasor may be used as separate commuting complex units.

From the foregoing and as mentioned above, it is observed that numerous variations and modifications may be affected without departing from the spirit and scope of the novel concept of the invention. It is to be understood that no limitation with respect to the embodiments illustrated herein is intended or should be inferred. It is intended to cover, by the appended claims, all such modifications within the scope of the appended claims.

I claim:

1. A method of parameter estimation in a multi-channel signal environment system wherein a plurality of receiving antennas receives signals or waves from one or more targets due to one or more transmitters that transmit a predetermined signal that is reflected back from the targets or receives signals that are directly transmitted from one or more external transmitters to the receiving antennas and then processed over multiple frequencies or channels by a digital receiver connected to one or more processors, comprises the steps of:

comparing received voltages to an analytic or a table driven calibrated channel model without only relying on information from lossy intermediate steps of at least one of time of arrival ("TOA") and angle of arrival ("AOA") measurements; and mitigating channel model calibration errors, including multiplicative channel noise, phase noise, clutter or multipath modeling errors, by using a noise model to estimate away error nuisance parameters, either during a prior calibration process or during a real time calibration process concurrent with localization and parameter estimation during normal system operation.

2. The method of parameter estimation in claim 1, wherein a Bayesian detection is used for the estimation of channel parameters including at least one of location parameters, shape parameters and reflector electromagnetic parameters.

3. The method of parameter estimation in claim 1, wherein the reflected signal from the target parameters is saved to be reused for dynamic tracking of the target.

4. The method of parameter estimation in claim 1, wherein a Bayesian particle filter is used to update mixture models for unknown parameters that might affect the reflected signal from the target.

5. The method of parameter estimation in claim 1, wherein the predetermined transmitted signal is a frequency stepped radar.

6. The method of parameter estimation in claim 1, wherein a target of the one or more targets is filtered by a delay range filter to minimize the clutter or focus in on known target parameter ranges.

7. The method of parameter estimation in claim 1, wherein a channel of the multiple frequencies or channels is presumed to have multiplicative Gaussian noise or additive noise not otherwise modeled by the calibration process.

8. The method of parameter estimation in claim 1, wherein multiple targets and the clutter are separated using multi-user detection techniques including at least one of successive interference cancellation and parallel interference cancellation.

9. The method of parameter estimation in claim 1, wherein one or more targets and the clutter are separated using multi-user detection techniques including at least one of successive interference cancellation and parallel interference cancellation in order to compute constant modulus phase normalization gains.

10. The method of parameter estimation in claim 1, wherein a state of a target of the one or more targets is tracked by saving one or more aggregate channel estimates and their gains or whereby a channel itself is a statistical mixture or a state machine requiring multiple discrete channel vectors.

11. The method of parameter estimation in claim 1, wherein the comparing and mitigating is triggered by a statistic that detects changes in the environment.

12. The method of parameter estimation in claim 1, wherein received voltages and calibration tables are whitened by a Hermitian inverse Cholesky factor of a measured or estimated interference covariance.

13. The method of parameter estimation in claim 1, wherein a Bayesian parameter update is constrained to place a lower bound on a variance in an effort to allow tracking changes in a parameter vector.

14. The method of parameter estimation in claim 1, wherein a parameter model includes higher order dynamic parameters including at least one of velocity and acceleration.

15. The method of parameter estimation in claim 1, wherein different shapes or reflector types are calibrated separately so that shape/type inference is implemented in the Bayesian estimator.

16. The method of parameter estimation in claim 2, where a progression of shapes or locations are used to infer gesture types.

17. The method of parameter estimation in claim 16, wherein machine learning is used for gesture determination.

18. The method of parameter estimation in claim 1, further comprising using a higher order singular value decomposition to compress a neural network into a single layer of optimized sum of products form.

19. The method of parameter estimation in claim 16, wherein the method decomposes a gesture recognition problem, into a set of discrete states whose transitions can be estimated using Bayesian techniques.

20. The method of parameter estimation in claim 1, wherein the system interpolates a wave function using basis functions that are reflected through objects of predetermined shape and electrical properties.

21. The method of parameter estimation in claim 1, wherein a reproducing kernel is used to generate a model of the reflected signal or a waveform at the receive antennas.

22. The method of parameter estimation in claim 21, wherein the reproducing kernel is used to dynamically learn the shape of the reflector and/or its electrical parameters.

23. The method of parameter estimation in claim 21, wherein a series decomposition of the reproducing kernel is used to obtain basis functions of the reflected wave.

24. The method of parameter estimation in claim 21, wherein a higher order singular value decomposition is used to decompose a tabulated version of the reproducing kernel using far fewer singular values.

25. The method of parameter estimation in claim 1, wherein electromagnetic imaging techniques are used to find basis functions for the reflected signal or wave.

26. The method of parameter estimation in claim 1, wherein conformal mappings are used to find basis functions for the reflected wave.

27. The method of parameter estimation in claim 26, wherein a Cauchy-Kovalevskaya extension is used to predict the basis functions for the reflected wave.

28. The method of parameter estimation in claim 1, wherein phase centers of an array of the plurality of receiving antennas are factored out for either removal or to reduce the number of bits required for accurate phase representation of the array.

29. The method of parameter estimation in claim 1, wherein a coupling matrix is applied to an output of an array of the plurality of receiving antennas to model mutual antenna coupling.

30. The method of parameter estimation in claim 1, wherein a Bicomplex Clifford algebra, that tracks both a complex pseudoscalar and a unit phasor is used as separate commuting complex units.

31. The method of parameter estimation in claim 1, wherein a Vekua transform to transform a set of basis functions for a simpler Laplace equation into a basis function is used for a more general Helmholtz equation.

32. A method of parameter estimation in a multi-channel signal environment wherein a plurality of receiving antennas and/or a plurality of transmitters transmit a signal or wave that is known or estimated that is processed over multiple frequencies or channels by a digital receiver connected to one or more processors for processing the signal, comprising the steps of:
  comparing received antennas array voltages to an analytic or table driven channel model from a calibrated template without only relying on information from lossy intermediate steps including at least one of time of delay and angle of arrival measurements to improve accuracy of reflected or emitter transmitted signals; and mitigating channel calibration errors from transmitted target signals by taking into account additive channel noise, multiplicative channel error, phase noise, multipath modeling errors by using a noise model to estimate away error nuisance parameters either during a calibration process or during a calibration process in real time localization and parameter estimation during normal system operation.

* * * * *